UNITED STATES PATENT OFFICE.

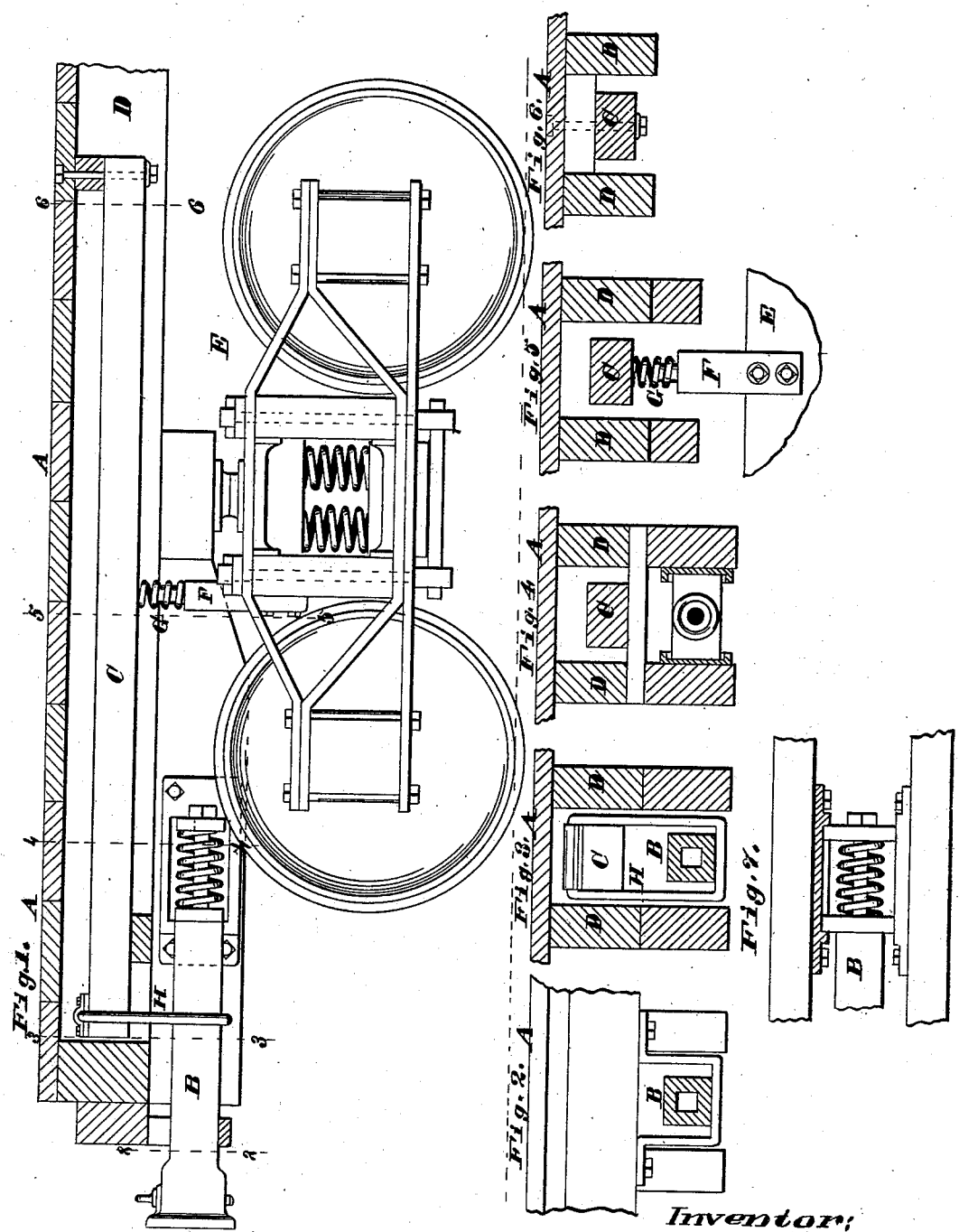

EBEN B. SANKEY, OF SALEM, MISSOURI.

DRAW-BAR FOR RAILWAY-CARS.

SPECIFICATION forming part of Letters Patent No. 266,897, dated October 31, 1882, Application filed August 28, 1882. (No model.)

*To all whom it may concern:*

Be it known that I, EBEN B. SANKEY, of Salem, in the county of Dent and State of Missouri, have invented a certain new and useful Improvement in Devices for Sustaining Draw-Heads of Railway-Cars, of which the following is a full, clear, and exact description, reference being had to the accompanying drawings, forming part of this specification, and in which—

Figure 1 is a longitudinal section of one end of a car with my improvement attached. Fig. 2 is a vertical section taken on line 2 2, Fig. 1. Fig. 3 is a vertical section taken on line 3 3, Fig. 1. Fig. 4 is a vertical section taken on line 4 4, Fig. 1. Fig. 5 is a vertical section taken on line 5 5, Fig. 1. Fig. 6 is a vertical section taken on line 6 6, Fig. 1, and Fig. 7 is a detail top view.

My invention relates to a means of sustaining draw-heads of railway-cars for convenience in coupling, so that the draw-heads of a loaded car, or one in which the body has sagged from long and heavy use, are on the same elevation as those of a car not loaded or new from the shop; and my invention consists in the points of novelty hereinafter fully described and claimed.

In the drawings, A represents part of the floor of a car-body, and B one of the draw-heads, both of which are of the usual form and construction. The draw-head is connected to the car in the ordinary well-known manner, and, as I claim nothing whatever new in the attachment, it will not be necessary to describe it here.

C is a lever, hinged by its inner end to the bottom of the car, between the usual longitudinal timbers, D D.

To the truck E of the car is rigidly secured a vertical post or standard, F, on the upper end of which is preferably placed a spring, G, upon which the lever C rests at a point forward of its connection with the car-body.

Depending from the forward end of the lever C is a stirrup, H, which passes beneath the draw-head B, as shown. It will now be seen that when the car-body is depressed by being loaded heavily, or when it becomes sagged by long use, the rigid stationary post on the truck will sustain the lever, instead of letting it descend with the car-body, which acts in turn upon the draw-head and sustains it, affording great convenience in the coupling of cars. The spring G is of sufficient strength to sustain the lever and draw-head, and I prefer using it rather than letting the lever bear directly on the post, so that if any severe downward strain is brought upon the draw-head it will be allowed to give, and thus avoid injury to the parts. The device would of course be applied to each end of a car.

I claim as my invention—

1. In combination with a truck, body, and draw-head of a railway-car, a lever so connected to the parts as to sustain the draw-head when the body sags, substantially as and for the purposes set forth.

2. The combination of car-body A, lever C, hinged to the car-body by its inner end, truck E, vertical post F, rigidly secured to the truck and supporting the lever C when the car-body descends, draw-head B, and stirrup H, connecting the lever and the draw-head, all substantially as shown and described, for the purpose set forth.

3. The combination of car-body A, lever C, truck E, vertical post F, supporting-spring G, draw-head B, and connecting-stirrup H, all constructed and arranged substantially as shown and described, for the purpose set forth.

EBEN B. SANKEY.

Witnesses:
J. G. PEACE,
L. B. WOODSIDE.